April 21, 1970 L. L. ANDERSON 3,507,268

HEATING DEVICE FOR MAINTAINING AN OPEN HOLE IN ICE

Filed April 30, 1968

INVENTOR.
LOREN L. ANDERSON
BY
Carlsen, Carlsen, Sturm & Hicks
ATTORNEYS

United States Patent Office 3,507,268
Patented Apr. 21, 1970

3,507,268
HEATING DEVICE FOR MAINTAINING
AN OPEN HOLE IN ICE
Loren L. Anderson, 1912 N. 21st St.,
Superior, Wis. 54880
Filed Apr. 30, 1968, Ser. No. 725,327
Int. Cl. F23b 3/00
U.S. Cl. 126—271.3                    2 Claims

ABSTRACT OF THE DISCLOSURE

A housing including an outer wall and an inner wall spaced therefrom together with a circular ring-like bottom forming a heating chamber. Positioned within the inner wall is a tube and positioned at the top of the chamber is a circular mouth member having an annular flange which directs heat from the chamber and the upper end of the tube.

SUMMARY OF THE INVENTION

The invention relates to an improvement in heating devices for maintaining a hole in the ice as open. It is an object of the invention to provide a housing having an annular chamber on the bottom of which fuel is placed for burning. An inner tubular member is positioned centrally of the chamber and through which a fish line is extended. The tubular member prevents the line from contacting the inner wall of the heating chamber. Positioned on the top of the chamber is an annular flange which directs heat away from the housing throughout 360 degrees. The flange also tends to keep the escaping heat from the fish line extended through the tubular member.

These and other more detailed and specific objects will be disclosed in the course of the following specification, reference being had to the accompanying drawings, in which.

Figure 1:
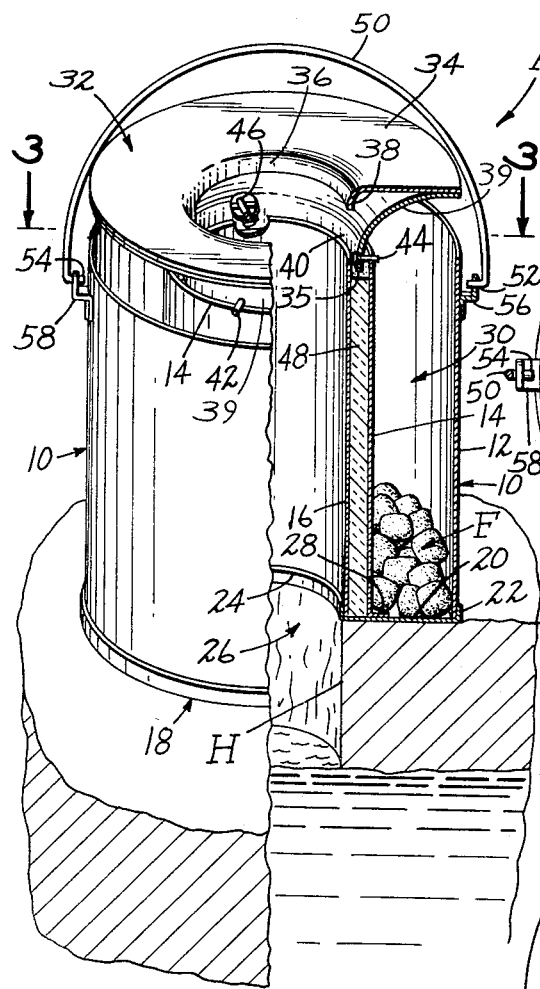
FIG. 1 is a perspective view of the device portions thereof being in section, other portions being broken away.
Figure 3:
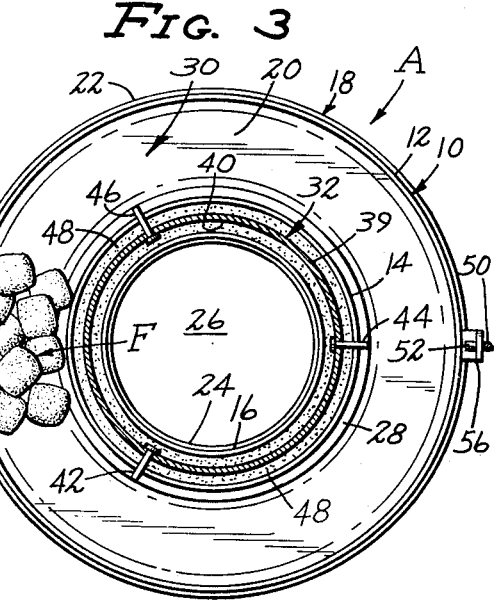
FIG. 3 is a sectional on the line 3—3 of FIG. 1.
Figure 4:
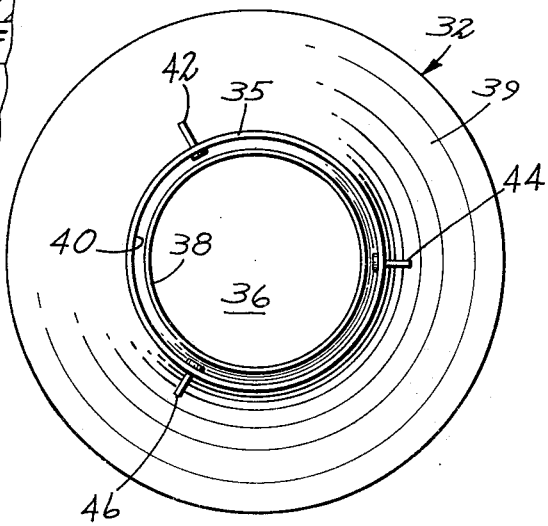
FIG. 4 is a bottom plan view of the mouth member.
Figure 2:
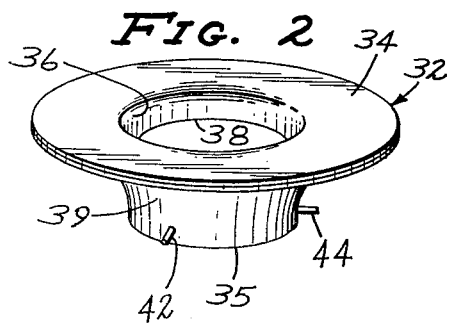
FIG. 2 is a perspective view of the mouth member.

Referring ot the drawings in particular, the device A includes the circular housing 10 including the outer circular wall 12 and the inner circular wall 14 spaced radially therefrom. Further included is the tubular member 16 which is spaced radially inwardly of the inner circular wall 14. The numeral 18 designates a circular base formed of the ring-like bottom 20, the outer upstanding peripheral flange 22 and the inner upstanding peripheral flange 24, the flange 24 defining an axial circular lower end opening 26 of the tube 16.

The lower end of the tube 16 is secured by spot welding or other conventional means to the flange 24, and the inner circular wall 14 has formed on the lower peripheral edge thereof the flange 28 which is spot welded or the like to the bottom 20. The lower peripheral edge of the wall 12 is spot welded to the peripheral flange 22 of the bottom 20. The walls 12 and 14 together with the bottom 20 form a heating chamber 30. The tube 16 forms a guide and a received for the fishing line extended through the housing and is concentric with both the inner wall 14 and the outer wall 12.

Further provided is a mouth member 32 which includes the flat circular ring-like top portion 34 having the axial opening 36 defined by the depending annular flange 38.

Secured to the underside of the top portion 34 of the mouth 32 is the circular ring-like flange portion 39 which converges arcuately downwardly and inwardly from the outer edge of the top 34 where it is attached by welding or the like. The inner extreme edge 35 of the flange portion 39 terminates in and defines an opening 40 concentric with the opening 36.

Extending outwardly from and connected to the flange 39 adjacent the lower edge thereof are the spaced pins 42, 44 and 46 which form shoulder or stop means which position the mouth 32 upon the upper edge of the inner circular wall 14. The pins 42, 44 and 46 are spaced from the lower edge of the flange 39 whereby a portion of the lower edge of the flange extends downwardly between the wall 14 and the tube 16, particularly FIG. 1. As a result the mouth 32 is automatically centered upon the wall 14 when the pins rest upon the wall. The diameter of the opening 40 is greater than the diameter of the tube 16 and less than the diameter of the circular inner wall 14.

The opening 36, the opening 40 and the tube 16 are all axial alignment whereby a fish line may be dropped and operated within and through the same. The flange 38 guides the line into and out of the tube 16. The lower opening 26 of the tube 16 is centered over an opening in the ice. Charcoal or fuel F to be burned is deposited on the bottom 20 of the heating chamber 30 where it is ignited. Heat is generated within the chamber 30 and conducts to the ice hole H where the same is kept open. The tube 16 protects the fishing line from the heat of the heat chamber wall 14. As heat is generated, the bottom 20 becomes hot, and the ice upon which the bottom rests melts but the melting is to no great extent. The hot bottom 20 rides on a film of water. The device provides literally a ring of heat around the ice hole H thereby keeping the hole open and free of ice. The space between the wall 14 and the tube 16 is filled with insulation 48 to further reduce the transfer of heat from wall 14 to tube 16. If the tube gets too hot, it can easily damage a fish line in contact with the same.

The flange 39 of mouth 32 directs heat rising from the chamber 30 outwardly and away from the top and side of the device with a 360 degree dispersement which keeps the heat away from the fishing line extended through the tube and prevents any concentration relative to the fisherman using the heater. A handle 50 is provided which has formed on the ends thereof the trunnion portions 52 and 54 which engage holes formed in the brackets 56 and 58, respectively, the brackets being secured to the wall 12.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A heating device for a hole in ice comprising:
   (a) a housing having an outer wall,
   (b) an inner wall spaced from said outer wall,
   (c) a bottom wall having a central opening and connected to said outer and inner walls at the lower ends thereof to form a heating chamber open at the top,
   (d) means adjacent said inner wall for guiding a fish line through the housing and out said central opening,
   (e) means carried by said housing for directing heat from said chamber outwardly of and away from the housing,
   (f) said outer wall being circular, (g) said inner wall being circular and concentric with said outer wall,
(h) said guiding means consisting of a tubular member open at both ends and carried by said bottom concentric with and spaced inwardly from and coextensive at its ends with the ends of said inner wall,
(i) said heat directing means including a circular flange depending from
(j) a top portion,
(k) an arcuate flange converging downwardly and inwardly from said top portion, and
(l) means for mounting said arcuate flange on said inner wall.

2. The device of claim 1 in which said means for mounting said arcuate flange on said inner wall includes extensions extending from said arcuate flange for engagement with said inner wall.

References Cited

UNITED STATES PATENTS

| | | | |
|---|---|---|---|
| 2,541,328 | 2/1951 | Boklep | 126—360 |
| 2,747,569 | 5/1956 | Holm et al. | 126—271.3 X |
| 3,177,404 | 3/1965 | Skog | 126—271.3 |

CHARLES J. MYHRE, Primary Examiner